(12) United States Patent
Lee

(10) Patent No.: US 7,099,150 B2
(45) Date of Patent: Aug. 29, 2006

(54) MULTIMEDIA BROADCASTING DEVICE AND A SUPPORT STRUCTURE THEREOF

(75) Inventor: Wang-Tsai Lee, Pan Chiao (TW)

(73) Assignee: Amtek System Co., Ltd., Taipei Hsien (TW)

( * ) Notice: Subject to any disclaimer, the term of this patent is extended or adjusted under 35 U.S.C. 154(b) by 71 days.

(21) Appl. No.: 10/713,009

(22) Filed: Nov. 17, 2003

(65) Prior Publication Data

US 2005/0105260 A1 May 19, 2005

(51) Int. Cl.
*G06F 1/16* (2006.01)

(52) U.S. Cl. ............ 361/683; 312/223.3; 248/923
(58) Field of Classification Search ......... 361/679–687, 361/724–727; 248/917–923, 278, 317, 371, 248/397, 457–460; 280/47.35; 312/223.1–223.6
See application file for complete search history.

(56) References Cited

U.S. PATENT DOCUMENTS 5,769,369 A * 6/1998 Meinel ............... 248/176.1
6,592,090 B1 * 7/2003 Li ..................... 248/284.1
6,822,851 B1 * 11/2004 Yukawa et al. ......... 361/679
6,837,469 B1 * 1/2005 Wu et al. ............. 248/278.1
6,839,227 B1 * 1/2005 Correa ................ 361/683
2003/0223188 A1 * 12/2003 Ha et al. ............... 361/681

* cited by examiner

*Primary Examiner*—Hung Van Duong
(74) *Attorney, Agent, or Firm*—Rosenberg, Klein & Lee

(57) ABSTRACT

A support structure is provided to accommodate a flat computer thereon and allows convenient viewing and manipulation of the flat computer. The support structure has a socle, a carrier platform, a first bi-directional adjustment mechanism, fixedly mounted to the socle, a second bi-directional adjustment mechanism, fixedly mounted to the carrier platform, and a connecting rod having two ends. One end of the connecting rod is connected to the first bi-directional adjustment mechanism, and the other end is connected to second bi-directional adjustment mechanism so as to enable adjustment of the inclination angle of the carrier platform and the connecting rod relative to the socle.

13 Claims, 6 Drawing Sheets

MULTIMEDIA BROADCASTING DEVICE AND A SUPPORT STRUCTURE THEREOF

BACKGROUND OF THE INVENTION

1. Field of the Invention

The invention relates to a multimedia broadcasting device and a support structure thereof, and more particularly a multimedia broadcasting device having a support structure.

2. Description of the Related Art

Flat computers have recently appeared on the market of electronic appliances. A flat computer has the characteristics of being flat and having a flat display, and currently constitutes a next generation of the notebook computer. The flat computer usually is provided with a digital stylus that allows the user to write directly on the computer screen. The user can also use a keyboard and a mouse to input data into the flat computer.

However, the flat computer may have the following disadvantages in utilization:

1. Due to its flat dimension, the flat computer has a good portability and is convenient for outdoor use. However, if the user wishes to use the same flat computer on a desk, the inclination angle of the flat computer cannot be easily adjusted, and its manipulation is less convenient.

2. Input and output of multimedia signals are usually achieved via the connection of external devices. The connection of several external devices can result in numerous cable connections, which may affect the aesthetic aspect and further necessitates manipulation from the flat computer.

SUMMARY OF THE INVENTION

It is therefore an object of the invention to provide a multimedia broadcasting device and a support structure thereof, which can accommodate a flat computer thereon, enables the adjustment of the flat computer, and further incorporates signal connecting terminals, and signal input/output devices for connecting to the flat computer.

It is another object of the invention to provide a multimedia broadcasting device and a support structure thereof, which can either associate the use of the multimedia broadcasting device in connection with the flat computer or allows the independent use of the multimedia broadcasting device.

To achieve the above and other objectives, a support structure of the invention comprises a socle, a carrier platform, a first bi-directional adjustment mechanism, fixedly mounted to the socle, a second bi-directional adjustment mechanism, fixedly mounted to the carrier platform, and a connecting rod having two ends. One end of the connecting rod is connected to the first bi-directional adjustment mechanism, and the other end is connected to second bi-directional adjustment mechanism so as to enable adjustment of the inclination angle of the carrier platform and the connecting rod relative to the socle.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
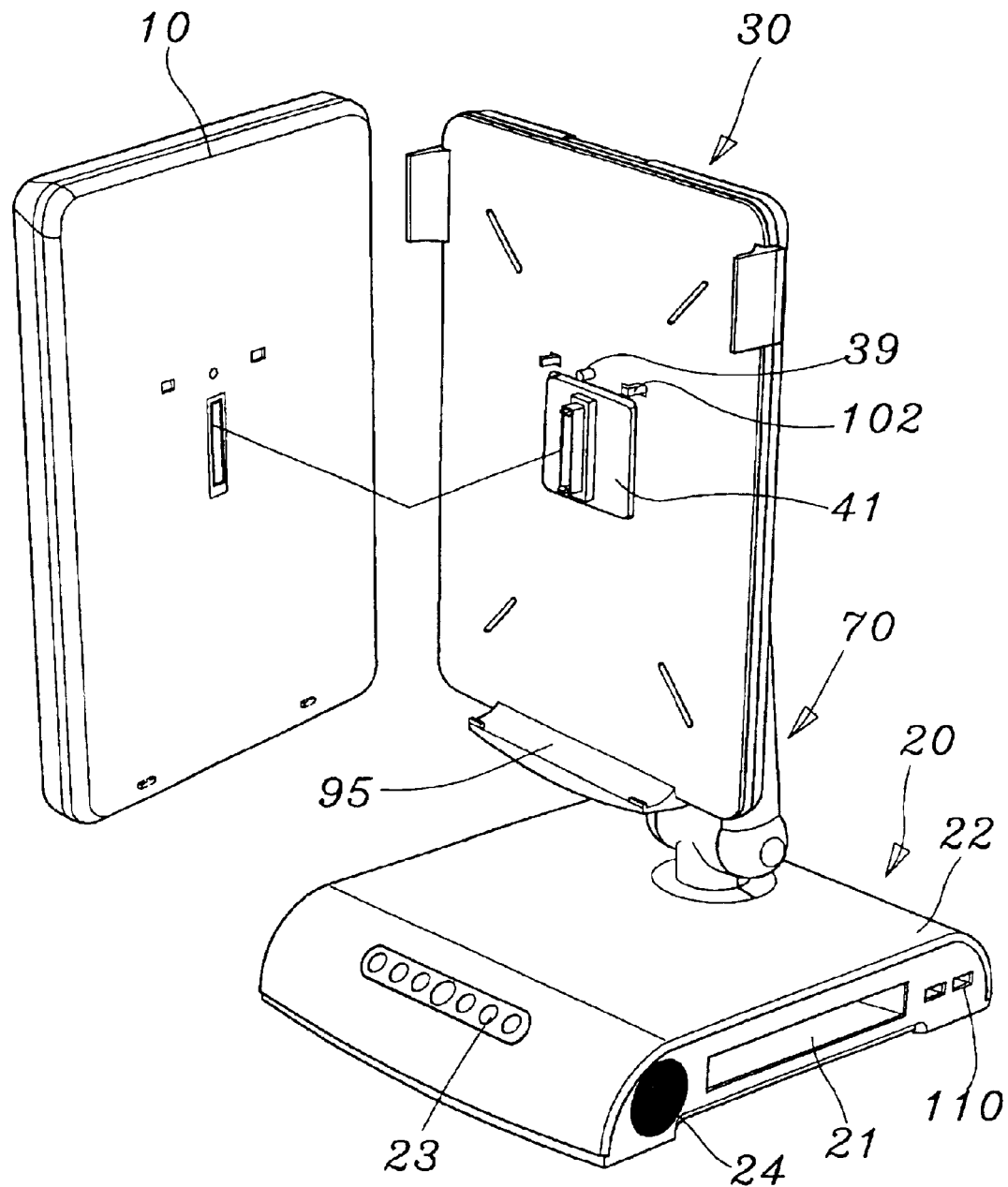
FIG. 1 is a schematic view of a support structure carrying a flat computer incorporating a multimedia broadcasting device according to an embodiment of the invention.

Wherever possible in the following description, like reference numerals will refer to like elements and parts unless otherwise illustrated.

Figure 2:
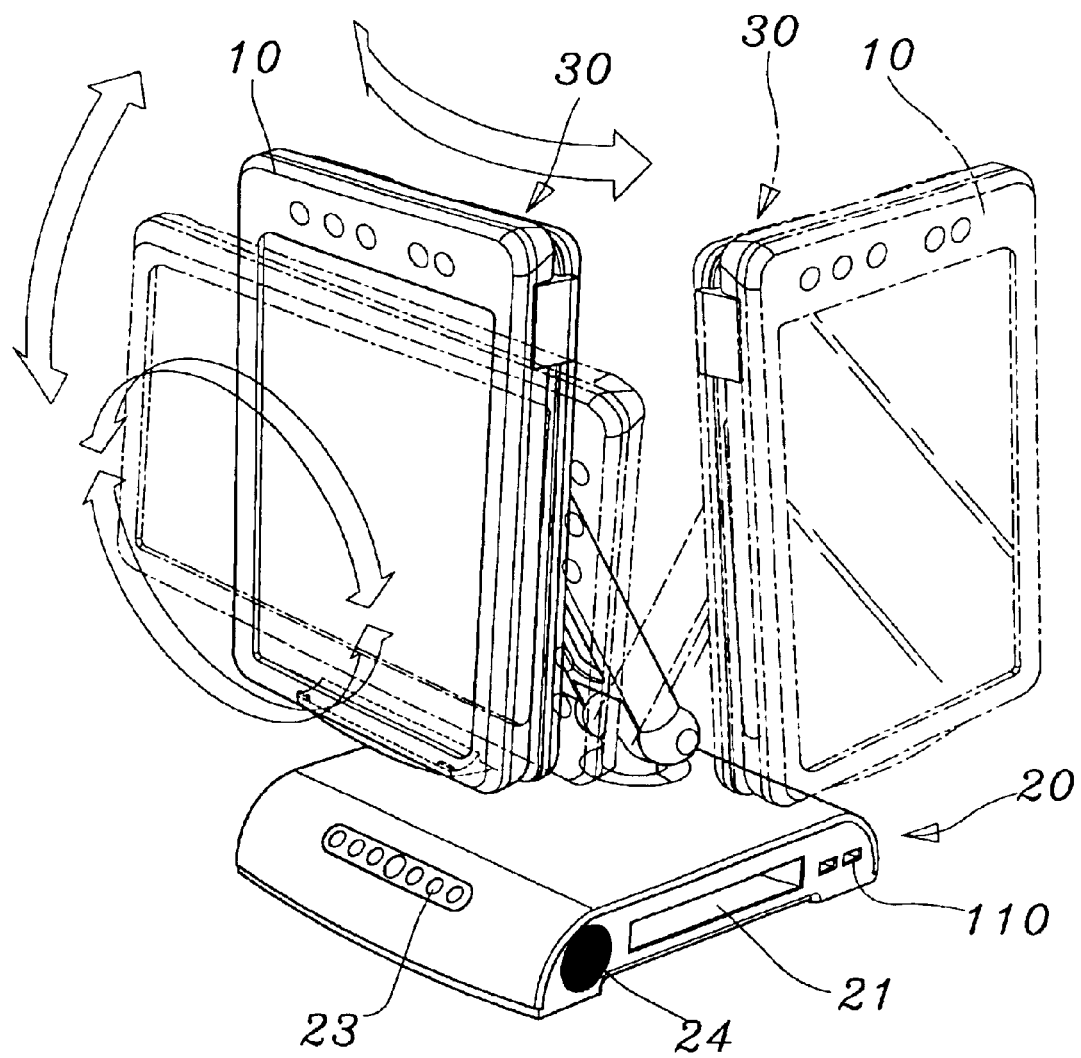
FIG. 2 is a schematic view showing an inclination adjustment of the support structure according to an embodiment of the invention.
Figure 3:
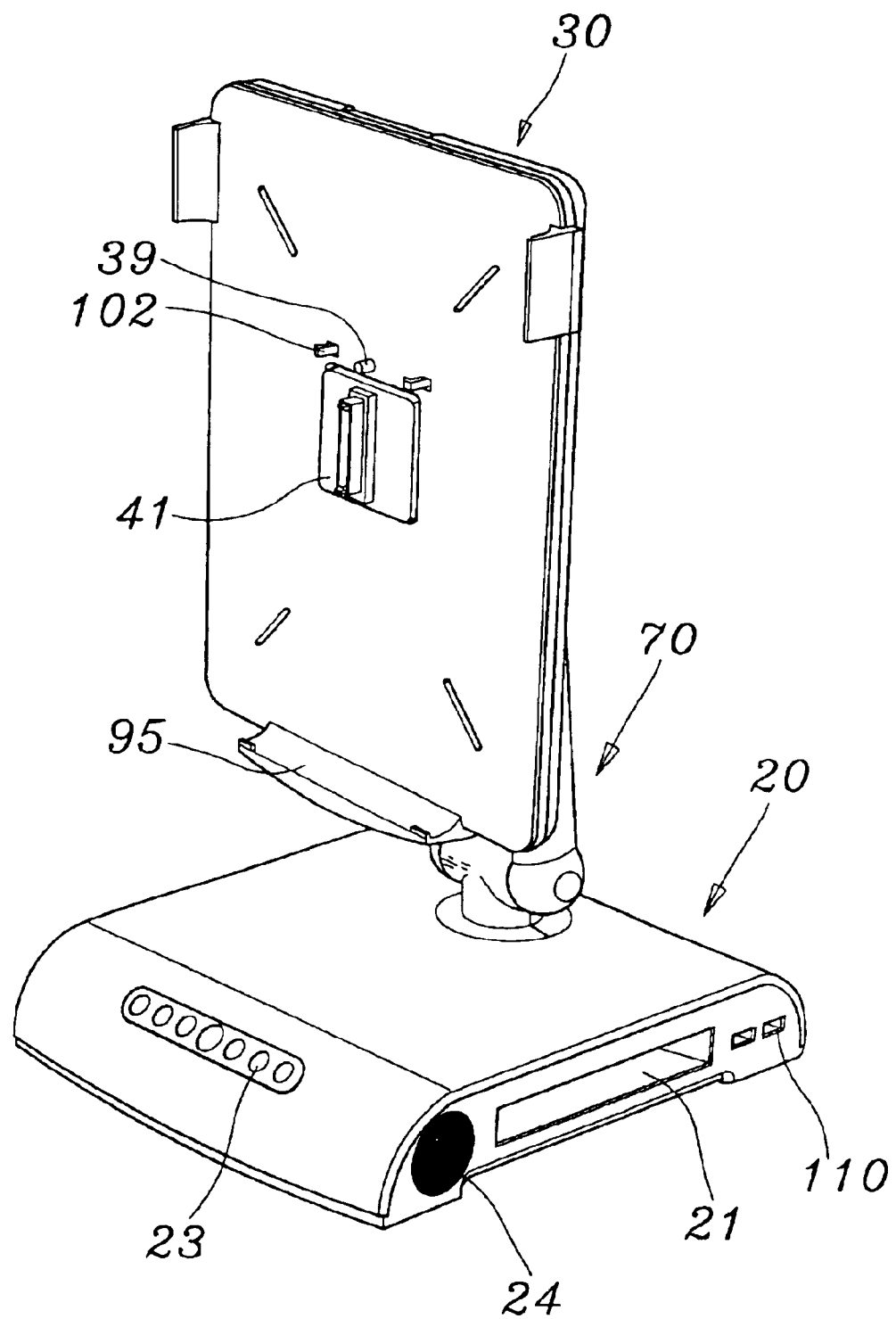
FIG. 3 is a perspective view of a support structure according to an embodiment of the invention.
Figure 4:
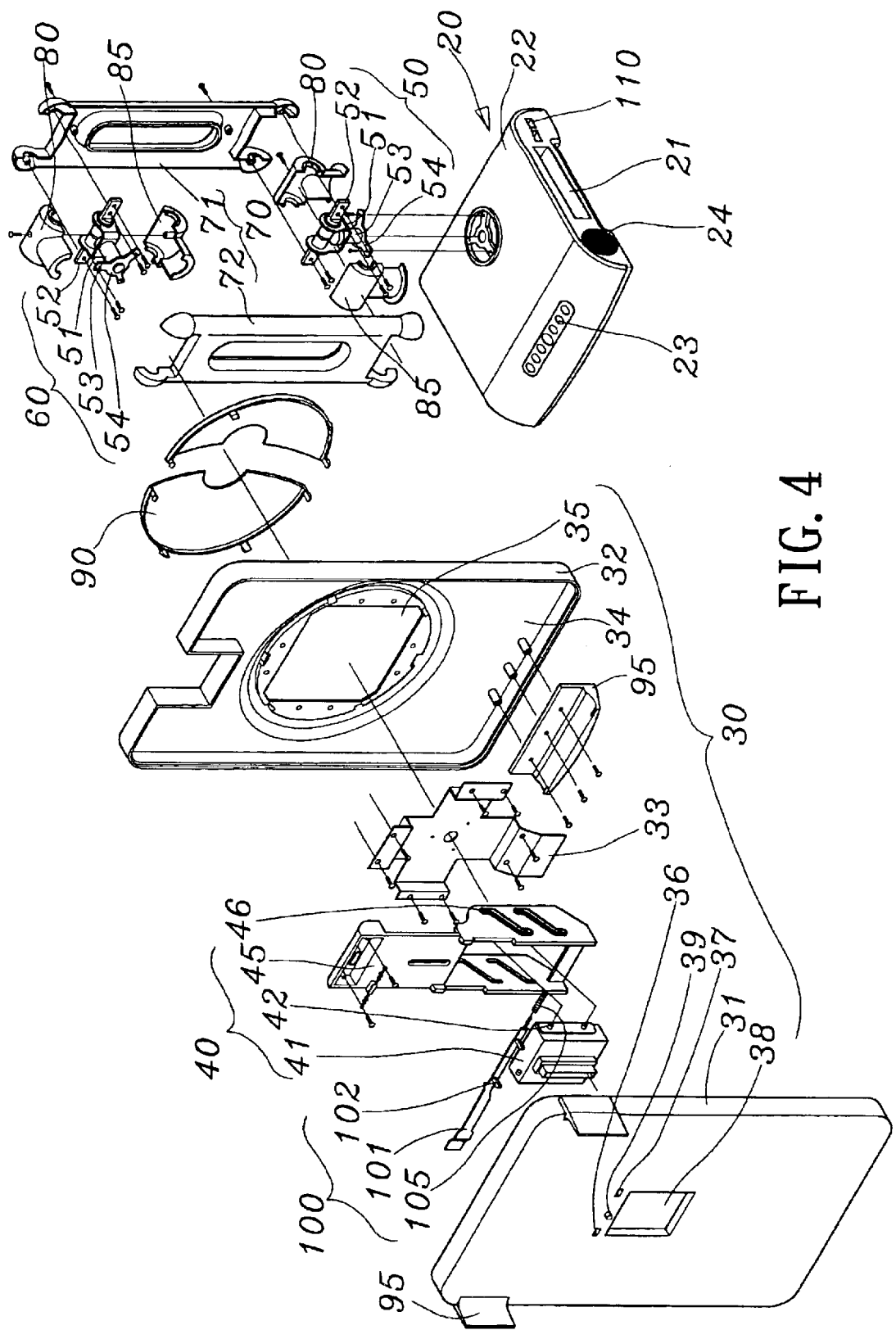
FIG. 4 is an exploded view of a support structure according to an embodiment of the invention.

Referring to FIG. 1 and FIG. 2, the invention describes a multimedia broadcasting device and a support structure thereof The support structure can accommodate one or more multimedia broadcasting devices and fasten a flat computer thereon. The support structure can be rotated to adjust the angle of observation of the computer, and thereby facilitates the observation and manipulation of the flat computer. Signal connecting terminals and input/output devices can be further integrated into the multimedia broadcasting device and a support structure thereof for connecting to the flat computer.

Referring to FIG. 3 through FIG. 6, the multimedia broadcasting device and a support structure thereof comprises a socle 20 having multimedia broadcasting units, a carrier platform 30, a connector assembly 40, first bi-directional adjustment mechanism 50, second bi-directional adjustment mechanism 60, and connecting rod 70. The connector assembly 40 is assembled on the carrier platform 30 to receive the flat computer 10 and electrically connect the multimedia broadcasting device 21. The first bi-directional adjustment mechanism 50 is fixedly attached on the socle 20, and the second bi-directional adjustment mechanism 60 is fixedly attached on the carrier platform 30. One end of the connecting rod 70 connects to the first bi-directional adjustment mechanism 50, and a second end of the connecting rod 70 fixedly attaches to the second bi-directional adjustment mechanism 60.

The socle 20 includes a multimedia broadcasting device 21, a socle base 22, and a sound amplifier 24. The multimedia broadcasting device 21 and the sound amplifier 24 are embedded at a side of the socle base 22. Each of the first and second bi-directional adjustment mechanisms 50, 60 respectively includes a body 51, and first and second axles 52, 53. Two ends of the first axle 52 transversally connect pivotally to the body 51. One end of the second axle 53 directly connects pivotally to the body 51. The first axle 52 of the first bi-directional adjustment mechanism 50 further connects to one end of the connecting rod 70. The second axle 53 of the first bi-directional adjustment mechanism 50 connects to the socle base 22. The first axle 52 of the second bi-directional adjustment mechanism 60 connects to the other end of the connecting rod 70, while the second axle 53 of the second bi-directional adjustment mechanism 60 fixedly attaches to the carrier platform 30. The body 51 has a U-shape, defining two lateral wings. The two ends of each of the first axles 52 respectively connect pivotally to the two wings and protrude therefrom to attach fixedly an end of the connecting rod 70. One end of each of the second axles 53 pivotally connects to a central portion of the body 51. Each of the second axles 53 further includes a connecting part 54. The connecting part 54 of the first bi-directional adjustment mechanism 50 fixedly attaches to the carrier platform 30.

The carrier platform 30 includes a first plate body 31, a second plate body 32, and a fastening plate 33. The first and second plate bodies 31, 32 are secured to each other to form an accommodating space 34. The second plate body 32 has a first through hole 35, and the fastening plate 33 forms a cross-shape and is placed in the accommodating space 34. One end of the fastening plate 33 fixedly attaches on the second plate body 32, and the fastening plate 33 bends and extends through the first through hole 35 to attach fixedly to the connecting part 54 of the second bi-directional adjustment mechanism 60. Casings 80, 85 mount together to enclose the first and second bi-directional adjustment mechanisms 50, 60. Two lids 90 cover the fastening plate 33 and abut against an outer side of the second plate body 32. Abutments 95 are further placed on a side of the carrier platform 30, and extend in the accommodating space 34 and fixedly secure to the second plate body 32. A positioning pin 39 protrudes from the first plate body 31 and serves as positioning reference for placement of the flat computer 10.

A retainer 100 is placed in the accommodating space 34 and extends from the carrier platform 30 for holding the flat computer 10 thereon. The retainer 100 includes a hooking rod 101 and spring 105. The hooking rod 101 has two protruding hooks 102 that slidably engage through corresponding holes 36, 37 of the first plate body 31. The spring 105 is fixedly mounted in the accommodating space 34. The hooking rod 101 is slidably assembled in the accommodating space 34, and has respectively one end abutting the spring 105 and another end extending out of the carrier platform 30.

Figure 5:
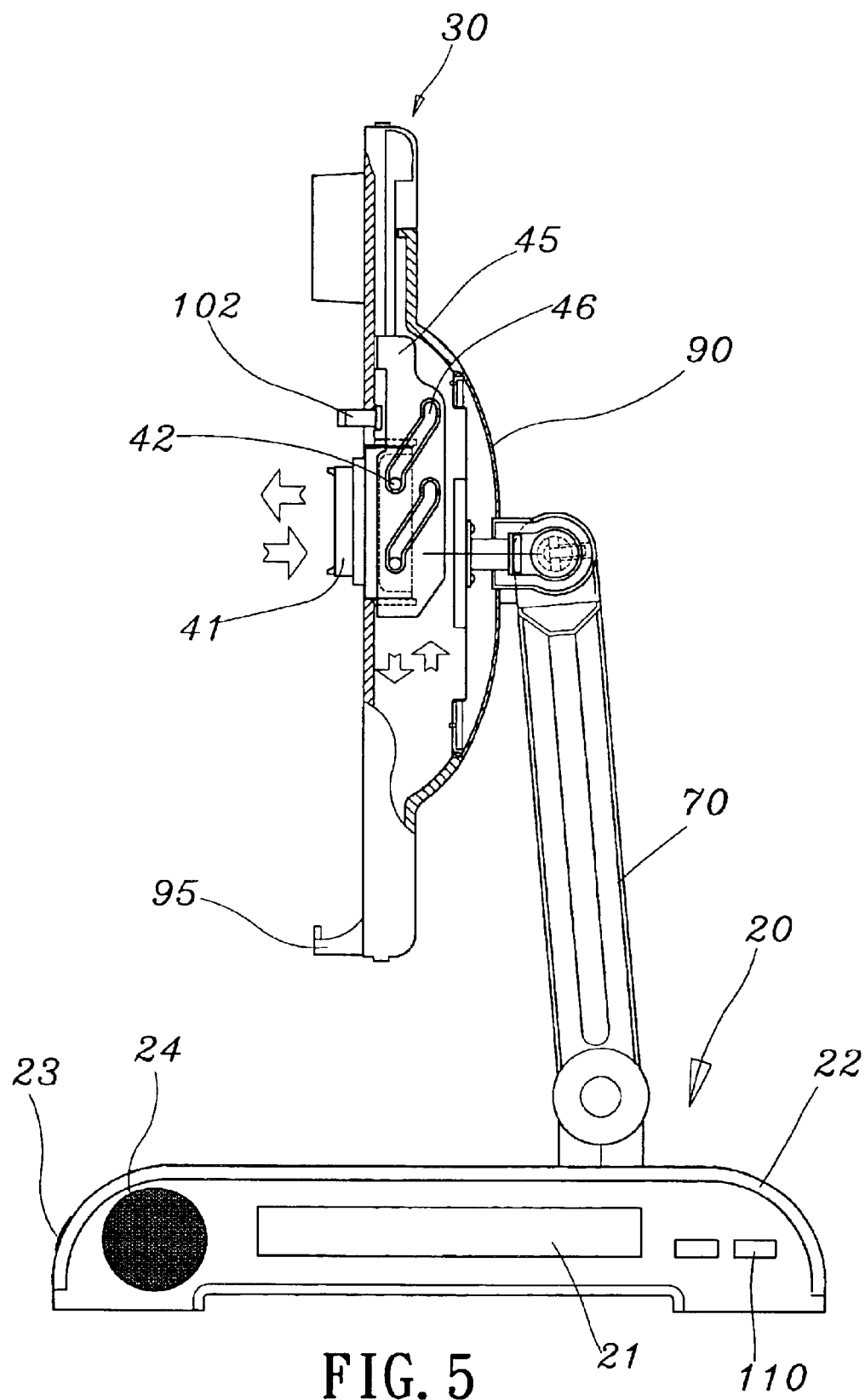
FIG. 5 is a sectional view of a support structure according to an embodiment of the invention.
Figure 6:
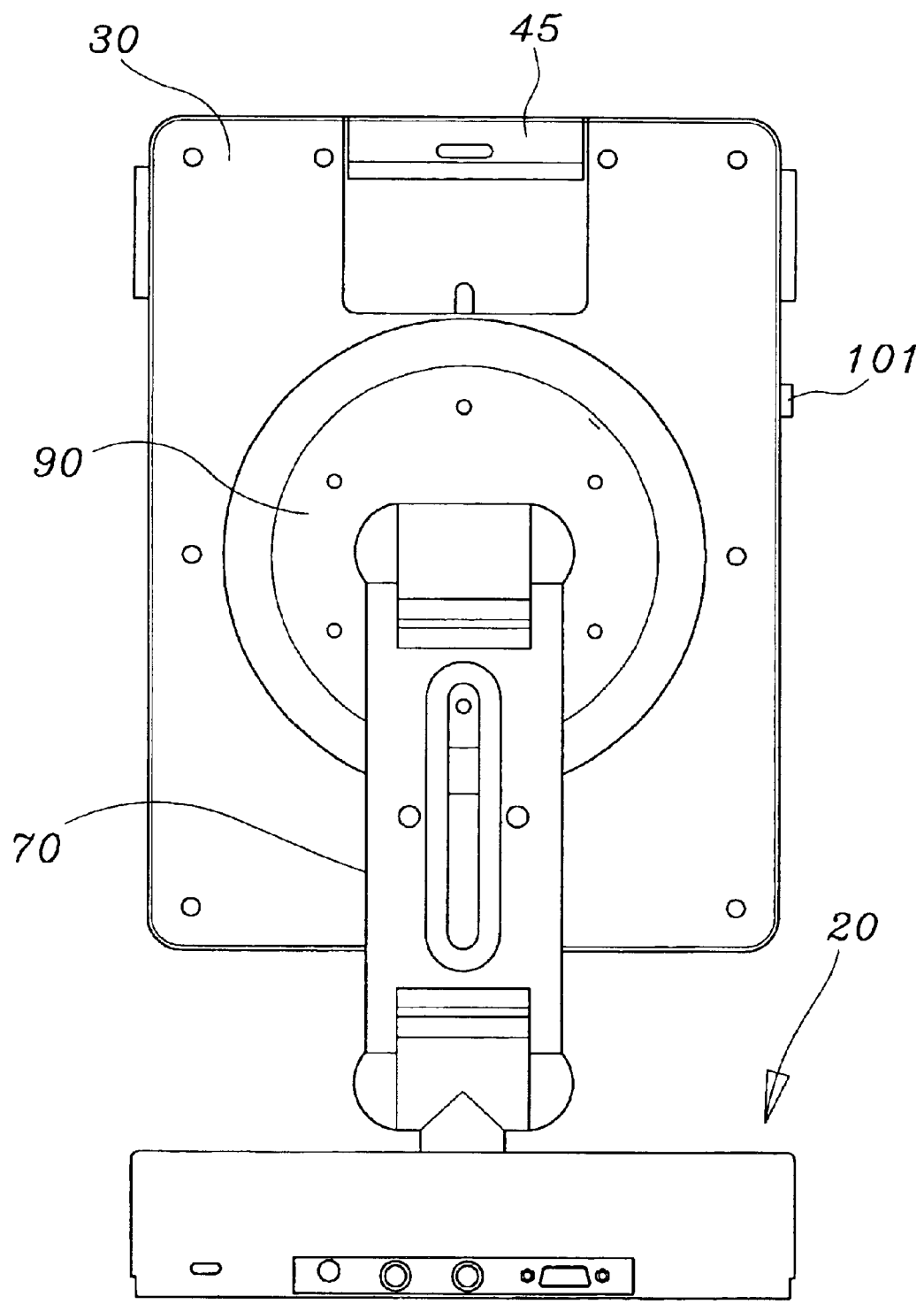
FIG. 6 is a rear view of a support structure according to an embodiment of the invention.

The connector assembly 4 includes a sliding connector 41 and a movement-driving piece 45, being placed in the accommodating space 34. The movement-driving piece 45 is slidably mounted on the first and second plate bodies 31, 32, and has one end protruding from the carrier platform 30. The sliding connector 41 has two protrusions 42 respectively sliding through slots 46 of the movement-driving piece 45. The sliding connector 41 can thereby slide to extend or retract through the hole 38, as shown in FIG. 5. By upward/downward move of movement-driving piece 45, the protrusions 42 of the sliding connector 41 slide along the slots 46 of the movement-driving piece 45, which thereby drives sliding of the sliding connector 41 through the hole 38. A USB connector 110, a PS/2 connector, a D-type connector and a power connector (not shown) may be further embedded in a side of the socle base 22 and connected to the connector assembly 40. Furthermore, manipulating buttons 23 can be placed on the socle base 22 and connected to the multimedia broadcasting device 21 and sound amplifier 24, being connected to the multimedia broadcasting device 21.

The connecting rod 70 includes first and second halves 71, 72. Respective axles 52 of the first and second bi-directional adjustment mechanisms 50, 60 are fixedly mounted on the first halve 71, and the second halve 72 covers the axles 52 by assembling to the first halve 71. Via this assembly of the first and second bi-directional adjustment mechanisms 50, 60, the carrier platform 30 and the connecting rod 70 can be thereby desirably adjusted by rotation to an adequate inclination angle relative to the socle 20.

As described above, a flat computer can be fastened on the support structure of the invention and the support structure allows for adjustment of the inclination angle of the flat computer for adequate viewing and manipulation. In addition, the support structure can integrate signal connecting terminals, signal input/output devices being connected to the flat computer. Furthermore, the support structure can incorporate a multimedia broadcasting device used in connection to the flat computer or used independently.

It should be apparent to those skilled in the art that the above description is only illustrative of specific embodiments and examples of the invention, and should not be construed in a limiting way. Therefore, the invention should cover various modifications and variations made to the herein-described structure and operations of the invention, provided they fall within the scope of the invention as defined in the following appended claims.

What is claimed is:

1. A support structure for accommodating a flat computer and allowing convenient viewing and manipulation by a user, the support structure comprising:
   a socle;
   a carrier platform;
   a first bi-directional adjustment mechanism, fixedly mounted to the socle;
   a second bi-directional adjustment mechanism, fixedly mounted to the carrier platform;
   a connecting rod, having two ends, wherein one end of the connecting rod is connected to the first bi-directional adjustment mechanism, and the other end is connected to second bi-directional adjustment mechanism, so as to enable adjustment of an inclination angle of the carrier platform and the connecting rod relative to the socle; and
   manipulating buttons disposed on the socle and connected to a multimedia broadcasting device.

2. The support structure of claim 1, further comprising a USB connector, a PS/2 connector, a D-type connector, and a power connector, being respectively embedded in a side of the socle and connected to the sliding connector.

3. The support structure of claim 1, further comprising an optical disc reading and/or writing device and a sound amplifier embedded in the socle, wherein the optical disc reading and/or writing device and the sound amplifier are connected to the sliding connector.

4. The support structure of claim 1, wherein the connecting rod includes first and second halves, the first and second bi-directional adjustment mechanisms being fixedly mounted to the first halve and the second halve being fixedly secured to the first halve.

5. A support structure for accommodating a flat computer and allowing convenient viewing and manipulation by a user, the support structure comprising:
   a socle;
   a carrier platform;
   a first bi-directional adjustment mechanism, fixedly mounted to the socle;
   a second bi-directional adjustment mechanism, fixedly mounted to the carrier platform; and
   a connecting rod, having two ends, wherein one end of the connecting rod is connected to the first bi-directional adjustment mechanism, and the other end is connected to second bi-directional adjustment mechanism, so as to enable adjustment of an inclination angle of the carrier platform and the connecting rod relative to the socle, each of the first and second bi-directional adjustment mechanisms further including each of the first and second bi-directional adjustment mechanisms further includes a body and first and second axles, wherein two ends of the first axle connect transversally and pivotally to the body, and one end of the second axle vertically and pivotally connects to the body, and wherein the first axle of the first bi-directional adjustment mechanism connects to one end of the connecting rod and the second axle of the first bi-directional adjustment mechanism connects to the socle, while the first axle of the second bi-directional adjustment mechanism connects to another end of the connecting rod and the second axle of the second bi-directional adjustment mechanism is fixedly mounted on the carrier platform.

6. The support structure of claim 5, wherein the body of the first and second bi-directional adjustment mechanism has a U-shape with two wings, two ends of each first axial part respectively connects pivotally to the two wings and extend out of the two wings to attach fixedly to the connecting rod, and one end of each second axle pivotally connects to a central portion of the body.

7. The support structure of claim 5, wherein each second axle further includes a connecting portion, a connecting portion of the first bi-directional adjustment mechanism is fixed to the socle, and a connecting portion of the second bi-directional adjustment mechanism is fixed to the carrier platform.

8. The support structure for accommodating a flat computer and allowing convenient viewing and manipulation by a user, the support structure comprising:
  a socle;
  the carrier platform, the carrier platform including a first plate body, a second plate body, and a fastening plate, the first and second plate bodies being assembled with each other to form an accommodating space wherein the fastening plate, is mounted;
  a first bi-directional adjustment mechanism, fixedly mounted to the socle;
  a second bi-directional adjustment mechanism, fixedly mounted to the carrier platform, the fastening plate being fixed to the second plate body and extending through a first hole of the second plate body to mount fixedly to the second bi-directional adjustment mechanism; and
  a connecting rod, having two ends, wherein one end of the connecting rod is connected to the first bi-directional adjustment mechanism, and the other end is connected to the first bi-directional adjustment mechanism, so as to enable adjustment of an inclination angle of the carrier platform and the connecting rod relative to the socle.

9. The support structure of claim 8, further comprising casing structures adapted for enclosing the first and second bi-directional adjustment mechanisms, and two lids covering the fastening plate and snap fitting to the second plate body.

10. The support structure of claim 8, further comprising a retainer received in the accommodating space between the first and second plate bodies and extending out of the carrier platform for fastening the flat computer on the carrier platform.

11. The support structure of claim 8, further comprising a sliding connector and a movement-driving piece, being respectively received in the accommodating space, wherein the movement-driving piece slides on the first and second plate bodies, one end thereof extends out of the carrier platform, and two slots are formed in two sides thereof, and wherein the sliding connector has two lateral protrusions sliding through the slots of the movement-driving piece and is thereby allowed to slide for extension and retraction through a fourth hole of the first plate body.

12. The support structure of claim 8, further comprising abutments at peripheral edges of the carrier platform and fixedly secured to the second plate body.

13. The support structure of claim 10, wherein the retainer includes a hooking rod and a spring connected to one first end of the hooking rod, wherein the hooking rod slides within the accommodating space and has one second end extending out of the carrier platform and two vertically protruding hooks that slidably extend through second and third holes of the first plate body.

* * * * *